United States Patent

Mapes

[15] 3,687,519
[45] Aug. 29, 1972

[54] SEMI-MICRO ABSOLUTE TRANSMITTANCE AND SPECULAR REFLECTANCE ACCESSORY FOR SPECTROPHOTOMETERS

[72] Inventor: James E. Mapes, Rockaway, N.J.

[73] Assignee: The United States of America as represented by the Secretary of the Army

[22] Filed: Feb. 24, 1971

[21] Appl. No.: 118,260

[52] U.S. Cl. ................ 356/96, 356/201, 356/209
[51] Int. Cl. .................... G01j 3/42, G01n 21/48
[58] Field of Search....356/36, 96, 97, 201, 204–206, 356/209–212, 244, 246

[56] References Cited

UNITED STATES PATENTS 3,402,634   9/1968   Bennett .................... 356/36
3,499,716   3/1970   Bennett .................... 356/209

Primary Examiner—Ronald L. Wibert
Assistant Examiner—F. L. Evans
Attorney—Harry M. Saragovitz, Edward J. Kelly and Herbert Berl

[57] ABSTRACT

This invention relates to an improved accessory for spectrophotometers having a plurality of reflecting means some of which are fixed and others exactly repositionable; all of such reflecting means are mounted upon a platform which can be kinematically positioned intermediate to a monochromatic light source and measuring means so that the monochromatic beam is reflected toward a semi-micro sample, which may be held in a cryostat, permitting the determination of absolute transmittance and reflectance over a wide range of temperatures.

5 Claims, 3 Drawing Figures

SEMI-MICRO ABSOLUTE TRANSMITTANCE AND SPECULAR REFLECTANCE ACCESSORY FOR SPECTROPHOTOMETERS

The invention described herein may be manufactured, used and licensed by or for the Government for governmental purposes without the payment to me of any royalty thereon.

BACKGROUND OF THE INVENTION

This invention relates to an improved instrument accessory which may be used with a spectrophotometer for measuring absolute transmittance, and specular reflectance on semi-micro solid sample specimens at temperatures which range from ambient to cryogenic. The term absolute transmittance or reflectance as used herein means the ratio of light transmitted by or reflected from the sample to the light incident on the sample. To achieve such absolute measurement, a device must be capable of measuring the light incident on the sample directly without the necessity of substituting a reference reflector in the place of the sample in the case of reflectance measurement. In the case of transmittance such substitution is not necessary. Since changes in the optical path are always required between incident and reflected light measurements, then where these changes cause errors more than the normal accuracy of the light measurement the errors must be measured and a correction made.

Prior art accessories for measuring either transmittance or reflectance have been in existence for many years, however, it has not been possible until recently to measure both of these properties of the same instrument without remounting the sample. Most of the present optical spectrophotometers require remounting of the sample in a different holder and accessory or in a different location within the accessory for the two types of measurements.

When samples are semi-micro in size and require measurements to be made at cryogenic temperatures, for example at temperatures which may range from 4° to 300° Kelvin, remounting is laborious, time consuming and expensive. Semi-micro size is defined as an area which varies from a minimum of three square millimeters to 10 square millimeters. The necessity for remounting not only causes the aforementioned problems, but may also impair the sample by exposure to the ambient atmosphere and to possible breakage through the additional handling.

Most reflectance accessories and combination transmittance and reflectance accessories require large sample sizes, for example greater than 300 square millimeters, in order to attain proper sensitivity in the measuring means. Where the sample is small, drastic masking of the beam is necessary with a resultant loss of accuracy in the measurement. With the expansion of research in ultraviolet light (UV), near infrared (NIR) and infra red (IR) spectroscopy, and especially in the widespread application of spectroscopy to solid state research on electronic band structure with vacuum and low temperature requirements, the need for an accessory to measure both transmittance and reflectance has increased. Transmittance measurements are used to define the spectral features in regions of weak absorption, for example in semi-conductors where point defects were created by doping and/or by radiation. In a similar manner specular reflectance is measured when it is necessary to define regions in the sample spectrum of very strong absorption such as those caused by band edges and excitons. In order to obtain more complete knowledge of a particular sample's spectral characteristic, both transmittance and reflectance must be made on the identical sample over a wide spectral range, usually from the UV to the IR at temperatures varying from 4° to 300° K. Where one desires merely to locate a position of peak absorption and/or to make a rough qualitative comparison of band intensities and shapes, a non-exact, relative measurement of transmittance and reflectance may suffice. However, where it is required to measure band intensities of certain energy level transitions in solids and compare these measured spectral characteristics with theoretical calculations, absolute measurements of transmittance and reflectance must be made. In order to obtain good correlation between the experimentally measured values and those obtained by theory it is necessary that the sample be taken from pure high quality single crystals. Pure crystals of this nature are difficult to obtain in large sizes and with many materials they are limited to a few millimeters or less. Small sizes are also advantageous when it is necessary to study hazardous materials, such as those used in explosives and pyrotechnic compounds, in order to protect operator and instrumentation from injury.

An instrument for measuring absolute reflectance and transmittance at cryogenic temperatures has been disclosed in U. S. Pat. No. 3,402,634 to H. E. Bennett. This instrument is not capable of measuring samples in the semi-micro range. Use of the device of reference on a semi-micro sample 1 mm X 3 mm would require masking the incident beam by a factor of approximately one hundred with an attendant increase in signal to noise ratio. A semi-micro sample size may be used in the present invention because the small number of mirrors used permits the distance between sample and focusing mirrors to be sufficiently short to obtain the required demagnification of the exit slit image. Another problem encountered in the use of the Bennett device is the inability to utilize the sample space available in commercial spectrophotometers without extensive modifications because of the large number of mirrors used in the system. The Bennett device cannot be used with commercially available cryostats; a specially constructed cryostat having movable mirrors attached thereto is required in order to make transmittance and reflectance measurements. The prior art device is more difficult to operate than the present invention. For absolute reflectance, with the Bennett device, two pairs of reflected and incident light measurements must be made. A first pair of measurements are made with the cryostat and sample in a 0° position, then a second pair of measurements must be made with the cryostat and sample rotated 180° from the 0° position. This procedure is followed in order to correct for different mirrors used for the incident and reflected light measurements. The average absolute reflectance is calculated as the average of the square roots of the two ratios of the reflected/incident light from the two pairs of measurements.

SUMMARY OF THE INVENTION

This invention relates to a spectrophotometer accessory for measuring absolute transmittance and reflectance at ambient or cryogenic temperatures of semi-micro size solid samples without having to remove the sample from the accessory between measurements.

An object of the present invention is to provide an apparatus to permit absolute measurement of both transmittance and reflectance at near normal incidence of a single vertically mounted sample without altering the mounting between measurements.

Another object of this invention is to provide an accessory which permits absolute measurement of transmittance and reflectance at temperatures which may range from ambient to 4° Kelvin using a conventional optical cryostat having two vertical windows.

Another object of this invention is to provide an accessory for a spectrophotometer which will permit it to measure both the absolute transmittance and reflectance of materials that are semi-micro in sample size.

Another object of this invention is to provide an accessory for spectrophotometers for measuring both absolute transmittance and reflectance using a minimum of mirrors for simplicity in mechanical construction and operation and for minimum reflection loss in the ultra-violet.

Another object is to provide an accessory for measuring absolute transmittance and reflectance, which because of its small size, will be capable of being used in the sample specimen space provided by commercially available spectrophotometers.

Another object of the present invention is to provide an accessory for measuring transmittance and/or reflectance on macro as well as micro samples.

A further object of the present invention is to provide a cheaper means for measuring both absolute transmittance and reflectance on the same samples at low temperatures.

For a better understanding of the present invention, together with other and further objects thereof, reference is made to the following description taken in connection with the accompanying drawings.

DETAILED DESCRIPTION OF THE INVENTION

Figure 1:
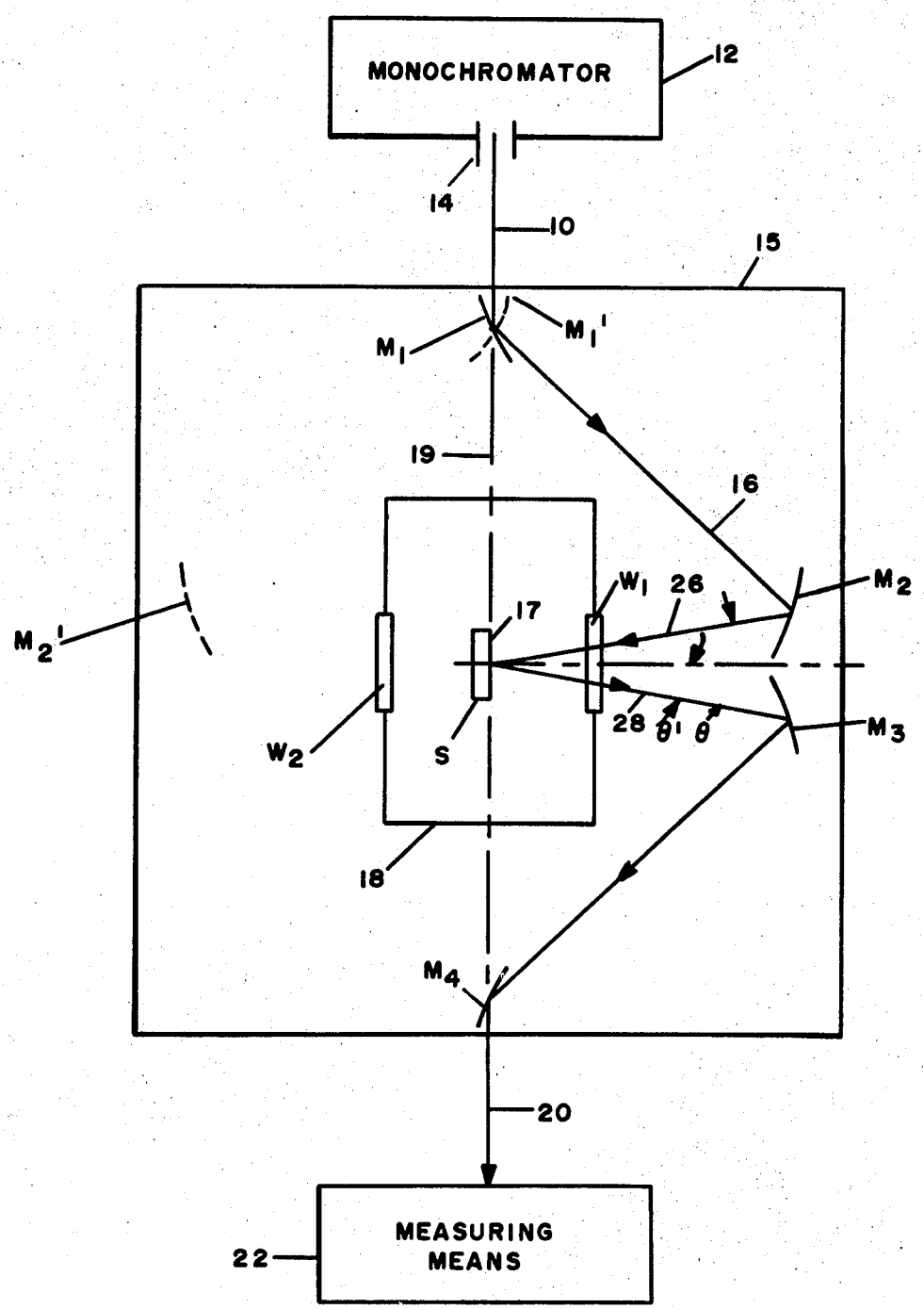
FIG. 1 is a schematic and block diagram of the optical system, the liquid helium cooled dewar in the spectrophotometer space, and the paths followed by the monochromatic light beam as it is reflected to and from the sample to a measuring means when making a reflectance measurement.

Referring now to FIG. 1, a beam of monochromatic light 10 is emitted from a monochromator 12 through an exit slit 14; the beam 10 is intercepted by a curved first surface mirror $M_1$. Mirror $M_1$ is rotatably mounted about a vertical axis on a horizontal mirror mount plate 15 so that mirror $M_1$ may be kinematically re-positioned to a first position stop $M_1$ and to a second position stop $M_1'$; wherein kinematically positioned is defined as the ability to exactly reorient an object spacially. The first position stop $M_1$ is used for a reflectance measurement and the second position stop $M_1'$ is used for measuring the true incident light and transmittance. For reflectance measurements the monochromatic beam 10 is intercepted by mirror position $M_1$ and directed to a curved first surface mirror $M_2$, the reflected beam being shown by a solid line 16; and mirror $M_2$ which is kinematically attached to the mirror mount plate 15 directs the light toward sample S. The reflecting face 17 of sample S is in the vertical plane which contains exit beam 10 and center line 19, and is equidistant, from dewar windows $W_1$ and $W_2$. The curvatures of $M_1$ and $M_2$ are chosen so that a reduced image of the exit slit of the monochromator 12 is formed on the surface of sample S when the reflected beam of mirror $M_2$ is directed through window $W_1$ of dewar 18. Specularly reflected light from the sample S is intercepted by a curved first surface mirror $M_3$ which is fixed to the mirror plate 15 and which deflects the beam to a curved first surface mirror $M_4$ which is also fixed to mirror plate 15; mirror $M_4$ directs the beam into the normal exit path 20 of the sample space colinear with exit beam 10, toward the measuring means 22.

Figure 2:
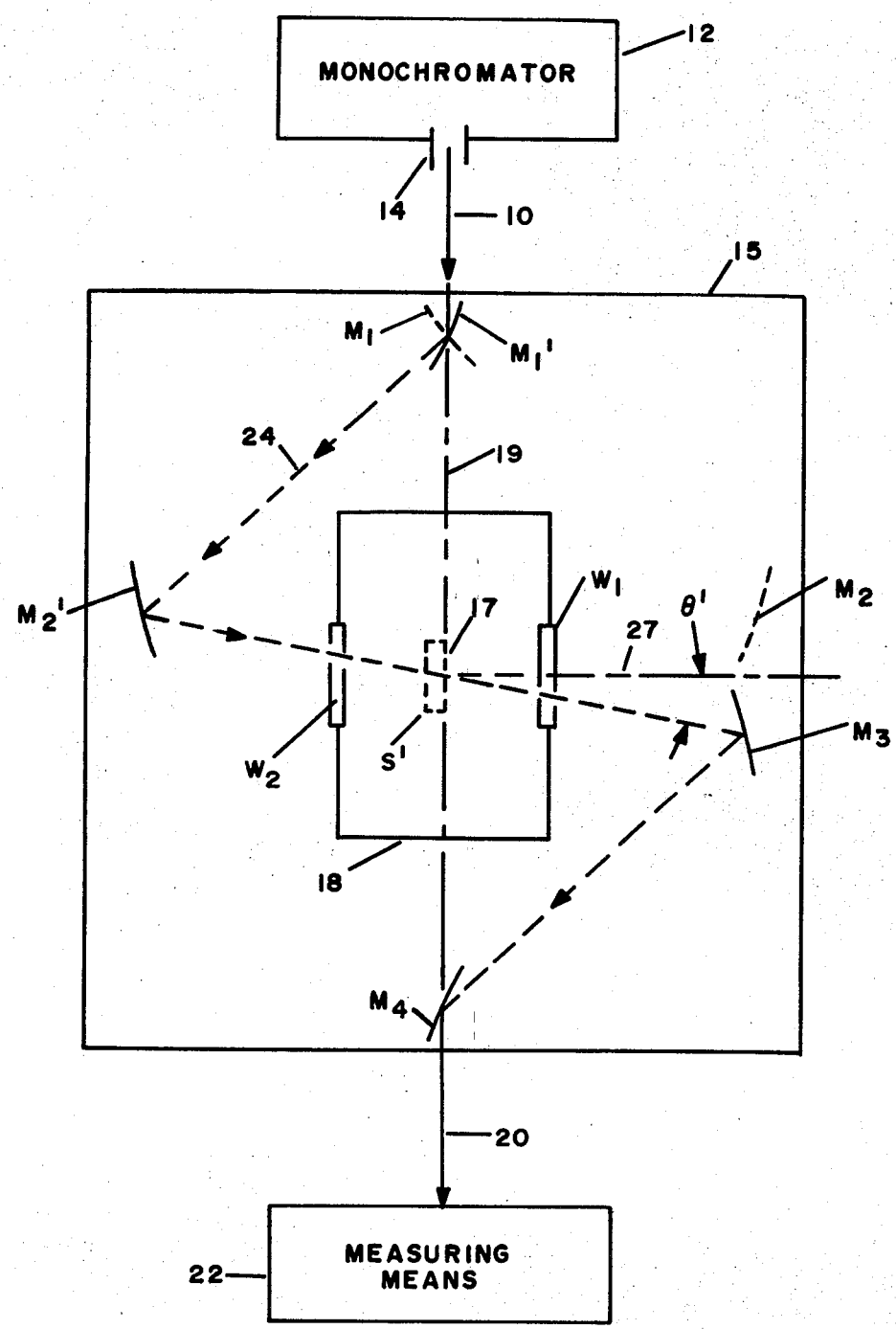
FIG. 2 is a schematic and block diagram showing how the optical system of FIG. 1 has been repositioned to measure the incident light without the sample.

FIG. 2 shows how a true measure of the incident light is made with sample S raised vertically to a second sample position S'. For this measurement mirror $M_1$ is rotated and repositioned to the second position stop $M_1'$. Mirror $M_2$ is kinematically repositioned to a second position $M_2'$ on mirror plate 15, which is the mirror image of position $M_2$ with respect to the center line 19. Under these conditions the monochromatic beam 10 is intercepted by mirror $M_1'$ and deflected toward mirror $M_2'$ as shown by dashed line 24; mirror $M_2'$ directs the incident light first through dewar window $W_2$, which is homogeneous and optically identical to dewar window $W_1$, and secondly through dewar window $W_1$ to mirror $M_3$ which deflects the beam to mirror $M_4$, which in turn redirects the beam into the normal exit path 20 to the measuring means 22. Since the identical mirror reflections occur in both the measurements of reflected light as shown in FIG. 1 and for the true incident light measurement as shown in FIG. 2, the absolute reflectance of the sample can be directly computed as the ratio of the reflected light over the incident light as measured.

Figure 3:
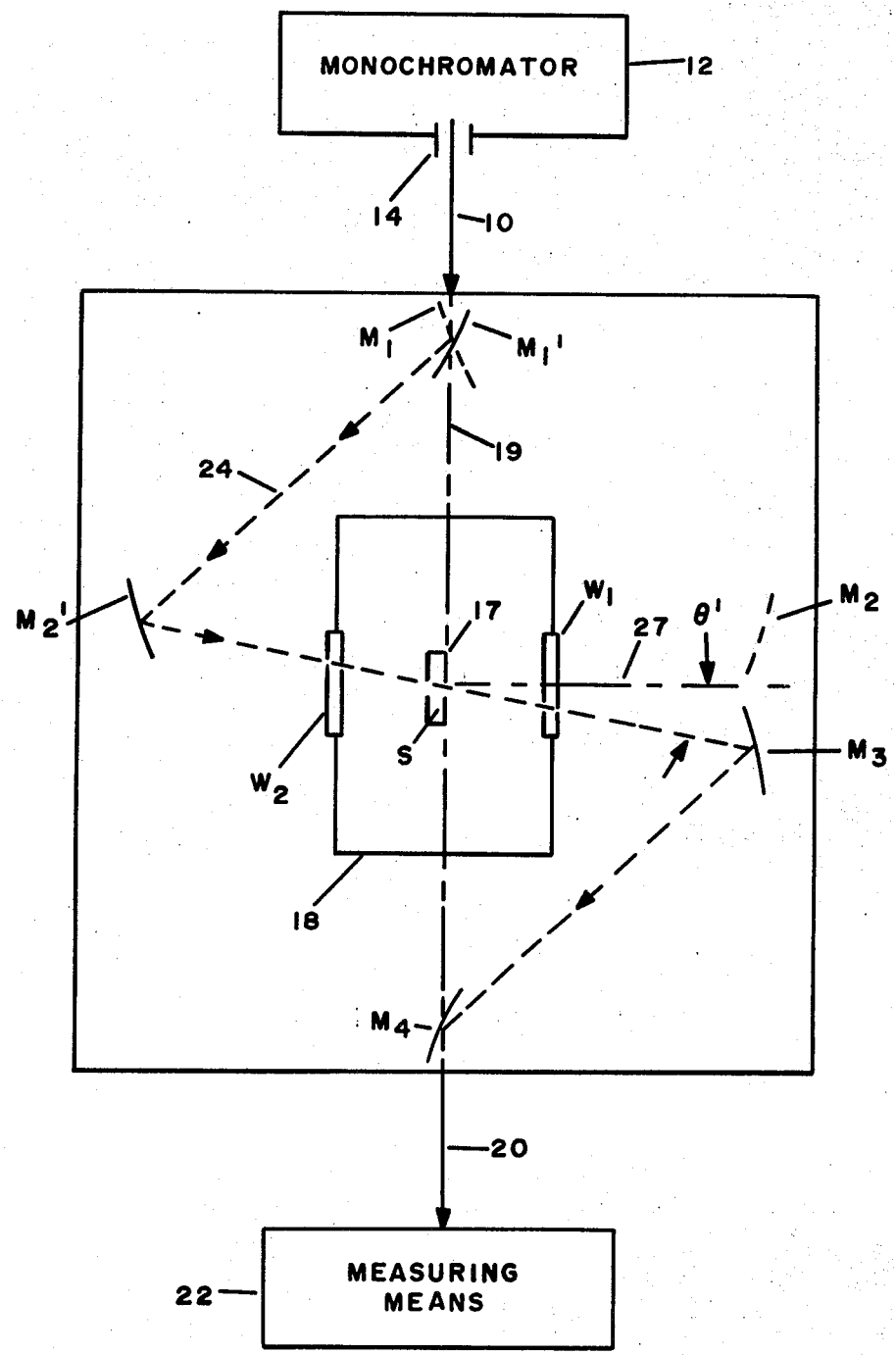
FIG. 3 is a schematic and block diagram showing how the optical system of FIG. 1 has been repositioned to measure transmitted light from the sample.

FIG. 3 shows how transmittance of the sample can be measured simply by returning the sample from its second position S' to its initial position S leaving mirrors $M_1'$ and $M_2'$ in their second position and measuring the value of the transmitted light on measuring means 22. Once again since the identical mirror reflections occur in both the measurement of transmitted light as shown in FIG. 3 and for the true incident light measurement as shown in FIG. 2, the absolute transmittance of the sample can be directly computed as the ratio of the transmitted light over the incident light as measured.

By keeping the angle $\theta$ formed by the incident light beam 26 and the reflected beam 28 as shown in FIG. 1 at a value of 15° to 20° the transmittance and reflectance measurements may be made at a near normal angle of incidence as indicated by angle $\theta'$; angle $\theta'$ is determined by a line 27 in space drawn perpendicular to the surface 17 of sample S and bisecting the angle $\theta$, giving $\theta'$ a value of 7.5° to 10°. Transmittance measurements at exactly normal incidence (not shown in FIGS. 2 and 3) can be made by either rotating the dewar 18 and sample S, or by rotating the sample S only, slightly so that $\theta'$ in FIGS. 2 and 3 is equal to zero.

An optical system as aforedescribed can be assembled by using a cryostat as manufactured by Andonian Associates, Inc., 26 Thayer Road, Waltham, Massachusetts, Model No. MHD 3L–024–200 and the mirrors $M_1$, $M_2$, $M_3$ and $M_4$ and alternate positions of $M_1'$ and $M_2'$ as shown in FIGS. 1, 2 and 3 spaced to fit the sample space of a commercial UV–VIS–NIR spectrophotometer as manufactured by Carry Instruments, 2724 South Pick Road, Monrovia, California, Model Carry 14.

The four mirrors of the present invention are mounted on mirror plate 15 which is kinematically positioned in the sample area. Thus, after initial alignment, the aforedescribed accessory is always in focus when placed in position.

I wish it to be understood that I do not desire to be limited to the exact detail of construction shown and described for obvious modifications will occur to a person skilled in the art.

What is claimed is:

1. An improved optical system for a spectrophotometer of the type wherein absolute transmittance and reflectance values of light are measured, having a monochromator emit a monochromatic exit beam of light, a dewar having first and second oppositely disposed windows, means for holding a solid sample having two oppositely disposed smooth faces in said dewar with one of said faces in a vertical plane, which contains said exit beam, equidistant between said windows and movable thereat, a means for measuring the amount of light from said sample wherein the improvement comprises:

means for mounting a plurality of reflectors;
   a first reflecting means, rotatably mounted on said means for mounting in line with said exit beam intercepting and deflecting said monochromatic beam which includes;
   a first, curved first surface mirror horizontally rotatably mounted on said mounting means;
   a first position stop for said first mirror intercepting and deflecting said monochromatic beam; and
   a second position stop for said first mirror intercepting and deflecting said monochromatic beam;
   a second reflecting means kinematically mounted to said mounting means in one of two positions, said positions being mirror images with respect to said vertical plane, for intercepting said beam from said first reflecting means and deflecting said beam through said first dewar windows toward said sample for reflectane measurements, or through said second dewar window for transmittance measurements at a near normal angle of incidence;
   a third reflecting means optically aligned and fixed to said mounting means for intercepting and deflecting reflected and transmitted beams from said sample; and
   a fourth reflecting means optically aligned and mechanically fixed to said mounting means for intercepting and deflecting said deflected beam from said third reflecting means to a normal exit path, which is in line with said monochromatic beam, to said measuring means.

2. The improved optical system as recited in claim 1 wherein said second reflecting means comprises:
   a second curved first surface mirror kinematically mounted to said mounting means, thereby permitting said second mirror to be positioned and repetitively relocated at a first of said two positions for intercepting and deflecting said monochromatic beam when said first mirror is in said first position stop, and to position and repetitively relocate said second mirror at a second of said two positions for intercepting and deflecting said monochromatic beam when said first mirror is in said second position stop, so that said second mirror can be used for making both reflectance and transmittance measurements.

3. The improved optical system as recited in claim 1 wherein said third reflecting means comprises:
   a third curved first surface mirror fixed to said mounting means to optically intercept and deflect light reflected from or transmitted through said sample.

4. The improved optical system as recited in claim 1 wherein said fourth reflecting means is a fourth curved first surface mirror.

5. The improved optical system as recited in claim 1 wherein said mounting means comprises:
   a horizontal platform kinematically located between said monochromator and said measuring means.

* * * * *